United States Patent
Penna et al.

(10) Patent No.: US 6,498,606 B1
(45) Date of Patent: Dec. 24, 2002

(54) Z-BUFFERING GRAPHICS SYSTEM

(75) Inventors: David E. Penna, Redhill (GB); Nikolaos Economidis, Thessaloniki (GR); Brian Gibson, Forest Row (GB)

(73) Assignee: Koninklijke Philips Electronics N.V., Eindhoven (NL)

( * ) Notice: Subject to any disclaimer, the term of this patent is extended or adjusted under 35 U.S.C. 154(b) by 277 days.

(21) Appl. No.: 09/588,745

(22) Filed: Jun. 6, 2000

(30) Foreign Application Priority Data

Jun. 29, 1999 (GB) .............................................. 9915012

(51) Int. Cl.[7] .............................................. G06T 17/00
(52) U.S. Cl. ...................................... 345/422; 345/421
(58) Field of Search ................................ 345/422, 421, 345/418, 605, 419, 420

(56) References Cited

U.S. PATENT DOCUMENTS

| | | | | |
|---|---|---|---|---|
| 5,493,637 A | * | 2/1996 | Martin | 345/602 |
| 5,517,603 A | | 5/1996 | Kelley et al. | 395/126 |
| 5,748,864 A | | 5/1998 | Martin | 395/122 |
| 5,886,701 A | | 3/1999 | Chauvin et al. | 345/418 |

FOREIGN PATENT DOCUMENTS

| | | | | |
|---|---|---|---|---|
| EP | 0704824 A3 | 4/1996 | ........... | G06T/15/10 |
| EP | 0704824 A2 | 4/1996 | ........... | G06T/15/10 |
| WO | WO9858352 | 12/1998 | ........... | G06T/17/20 |

* cited by examiner

Primary Examiner—Cliff N. Vo
(74) Attorney, Agent, or Firm—Russell Gross

(57) ABSTRACT

In an image processing system for providing two-dimensional pixel images comprised of a purality of polygonal image primitives and a background, the polygonal image primitives representing a three-dimensional object, a Z buffer and a color buffer are cleared by the steps of rendering image primitives relating to foreground in the color buffer (354) and the Z buffer (353); and subsequently scanning the Z buffer and for each pixel, if the Z value is a predetermined background value such as zero (357), clearing the corresponding location in the color buffer to background color (358), and if the Z value is not the predetermined background value, clearing the Z buffer to that predetermined background value (359). In the method, either a Z buffer or a color value is written during the buffer clearing process, but never both. The pixels may be read from cache in groups, the size of a group being selected to maximize the possibility of all consecutive pixels in a group being either foreground or background pixels. Further bandwidth saving may be achieved by the use of a tile buffer and two output buffers.

14 Claims, 4 Drawing Sheets

Z-BUFFERING GRAPHICS SYSTEM

The present invention relates to a method and apparatus for image processing, and in particular relates to the rendering operations in a Z-buffered polygon-based graphics system.

It is a common technique in real-time computer graphics to model objects as meshes of polygonal image primitives, especially triangles, for ease of handling. This is particularly the case for three-dimensional object modelling wherein, to obtain a two-dimensional image from three-dimensional image data, the polygons making up the object surface in three-dimensional space are projected into two-dimensional space and, following any necessary calculation or reference to look-up tables, appropriate pixel values (including colour, texture etc.) are mapped onto pixel positions within the projected two-dimensional polygon.

Z-buffering is a well known technique in computer graphics and involves the storage of a depth (Z) value for each pixel position within a polygon to allow depth sorting for overlapping polygons and consequently the avoidance of unnecessary pixel value mapping for polygons that are occluded by another polygon in front of them. An example of this is described in, for example, U.S. Pat. No. 5,825,363 (Anderson) wherein, per pixel, an initial determination is made as to whether a selected geometric shape obscures another geometric shape at that pixel and, if so, the value of the selected shape at that pixel is stored.

Colour buffering is also a known technique in computer graphics and involves the use of a buffer in which pixel colour or texture values for subsequent display are assembled: where an image is constructed a polygon at a time, the colour or texture at a given pixel may change a number of times during rendering of a frame as successive polygons impacting that pixel are processed. On the other hand, where no polygons impact a given pixel, that pixel will remain unchanged with a specified background colour for the image. At the conclusion of rendering the image, the Z buffer contents typically have to be cleared with whatever background depth value is specified replacing the accumulated depth values for the polygons. Also, where only a single display buffer is provided for screen refresh, it will be necessary for the contents of the colour buffer to be copied to the display buffer at the conclusion of rendering: where a pair of alternating display buffers are provided, the image can be constructed directly into one whilst the other provides screen refresh for the preceding image.

A problem common to most, if not all, such architectures arises at the conclusion to rendering when there is a large amount of memory transfer going on whilst little processing occurs. This volume of data transfer results in a bottleneck in the rendering process which can degrade the overall performance, and a number of techniques have been proposed to improve efficiency in handling of Z values in particular. In U.S. Pat. No. 5,748,864 (Martin), a method of rendering is disclosed in which each stored Z value is augmented by a sequence number such that it is not necessary for the Z buffer to be cleared at each frame; by reference to the sequence numbering, the buffer contents can be recycled a number of times between clears, although this does of course require a larger buffer to accomodate the additional data of the sequence numbers. In U.S. Pat. No. 5,517,603 (Kelley et al), there is disclosed a rendering device using a hardware scanline approach in which the bandwidth requirements between a system frame buffer and the rendering device are minimised by building up the image a line at a time thereby requiring much smaller (and therefore faster) buffers, although with much more frequent copying or data transfer operations.

It is an object of the present invention to provide an image processing technique (and apparatus embodying the same) which improves handling efficiency by reducing bandwidth requirements when clearing buffers and without sacrificing buffer capacity to sequence numbers.

According to a first aspect of the present invention there is provided a method of operating a Z buffer and a colour buffer in an image processing system for providing a two-dimensional pixel image composed of a plurality of polygonal image primitives and a background, said method comprising the steps of:

a) rendering image primitives relating to foreground in the colour buffer and the Z buffer; and b) scanning the Z buffer and for each pixel, if the Z value is a predetermined background value, clearing the corresponding location in the colour buffer to background colour, and if the Z value is not said predetermined background value, clearing the Z buffer to said predetermined background value.

According to a second aspect of the present invention there is provided a method of operating a Z buffer and a colour buffer in an image processing system for providing a two-dimensional image composed of a plurality of polygonal image primitives and a background, said method comprising the steps of:

a) rendering image primitives relating to foreground in the colour buffer and the Z buffer;

b) scanning the Z buffer and for each pixel, if the Z value is a predetermined background value, copying the background colour to a store, and if the Z value is not said predetermined background value, copying the colour value to the store and clearing the Z value.

In one implementation of the inventive method, use is made of the fact that pixels whose Z value is still set to the background value (which might suitably be at Z=0) have not been altered, and these values do not have to be cleared to their background state. Also, the colour buffer is not cleared before the rendering process is begun; for those pixels whose Z values are still set to the background value, the colour values can be set to the background value after rendering of the foreground pixels. In effect for such an implementation, for each pixel, either a Z value or a colour value is written during the buffer clearing process, but never both.

Also according to the first and second aspects of the present invention there are provided image processing systems as defined in the attached claims to which refrnce should be made and the disclosures of which are incorporated herein by reference.

The invention will now be described by way of example only with reference to the accompanying drawings in which.

Figure 1:
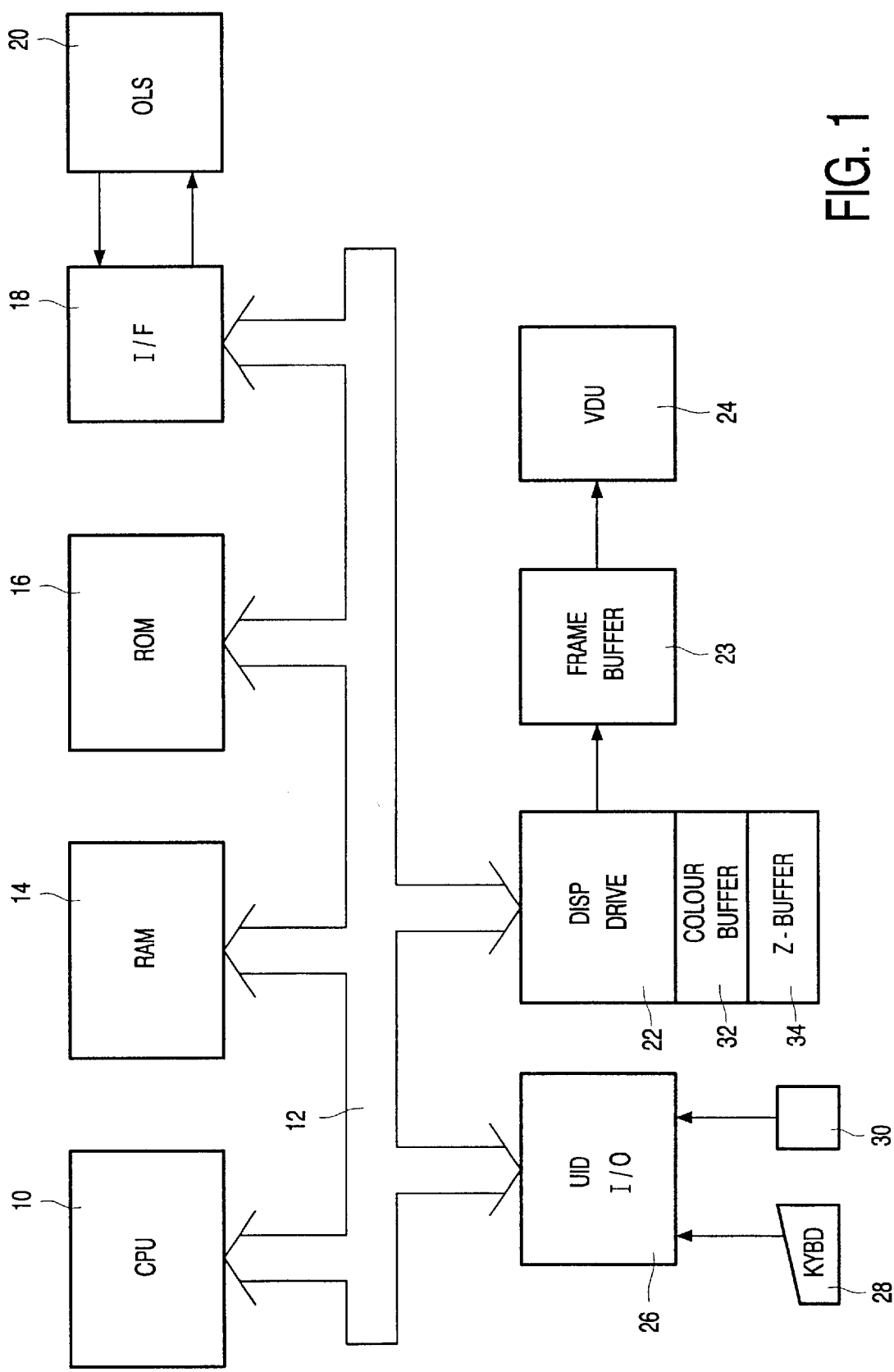
FIG. 1 is a block schematic diagram of an image processing system suitable for implementing the present invention.

A data processing system configured as an image processing apparatus is shown in FIG. 1. The system has a processing unit in CPU 10, arranged to process three-dimensional image data to produce for display a two-dimensional view of objects modelled in a virtual three-dimensional world. The CPU 10 is coupled via data and address bus 12 to random access and read-only memories in RAM 14 and in ROM 16 and also, via a suitable interface 18, to a further offline data store OLS 20. The OLS 20 may provide the source of three-dimensional data and instructions controlling the operation of the CPU 10 from a permanent storage device such as a magnetic disk, an optical disk, a magneto-optical disk or other suitable storage medium. The main constraint on the form of OLS in such an arrangement is that it be capable of supplying data via the interface 18 and bus 12 to the CPU 10 at the required rate. In a more efficient arrangement, however, the data and instructions may be loaded up in RAM 14 for speed of processing by a dedicated renderer and post-processor.

Also connected to the bus 12 is a frame buffer and display driver stage 22 arranged to generate video images which are supplied through a frame buffer 23 to a video monitor VDU 24. To enable user control or contribution to the image generation process, a user input device interface 26 is connected to the bus 12 with input devices such as a keyboard 28 and mouse 30 connected to the interface.

In the illustrated arrangement a storage area in the display driver 22 holds a colour buffer 32 and a Z buffer 34, and the post-processor for manipulating the stored data is a dedicated component in the display driver 22. In an alternative arrangement (not illustrated), the RAM 14 holds a colour buffer and a Z buffer, and the post-processor functionality is provided as a subset of the functions of the CPU 10.

Figure 2:
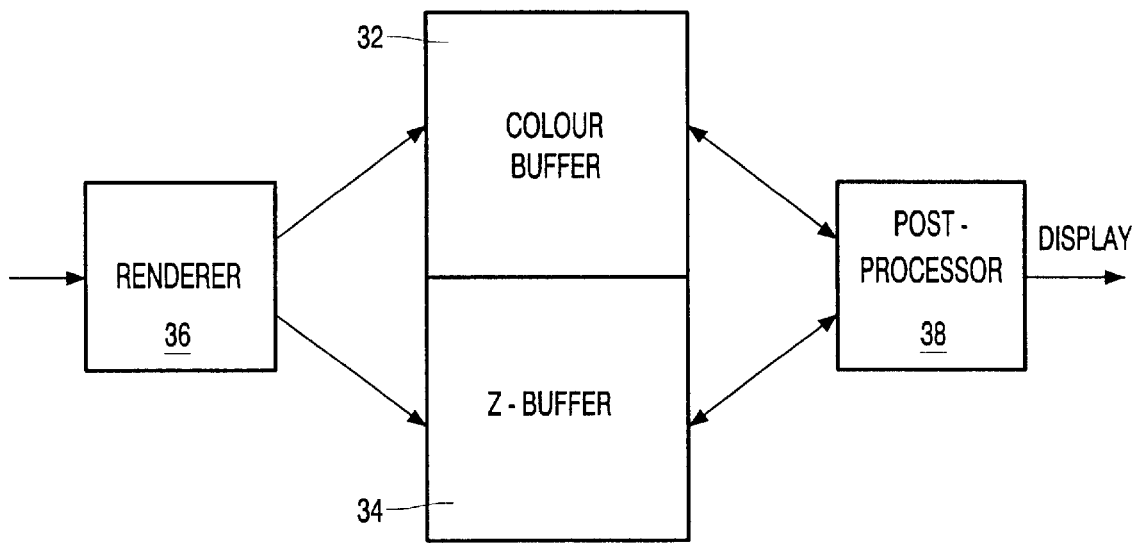
FIG. 2 illustrates a colour buffer and a Z buffer in more detail.

FIG. 2 schematically illustrates a detail of FIG. 1 in which the parts of the apparatus involved in rendering are indicated by renderer 36, and the post-processor is referenced 38. The colour buffer 32 and Z buffer 34 are connected between the renderer and the post-processor.

For the purposes of illustration, some aspects of a conventional rendering and buffer clearing operation will initially be described. The Z buffer 34 and colour buffer 32 are both initialised to their background values; there is one colour value and one Z value for each pixel; each Z buffer location is set to a value corresponding to the largest possible distance of the displayed three-dimensional object from a viewer, and the colour value is set to the background colour when there is no three-dimensional object in front of it. The background colour may be constant across the screen, or may be more complex, such as a sky-ground model with appropriate areas of colour for sky, clouds, ground etc.

The three-dimensional objects are modelled as polygons, typically triangular meshes. For each frame, the objects are rendered pixel by pixel. When a complex scene with overlapping objects is generated, some pixels relating to foreground may be overwritten a few times during rendering, until the "front surface" of the object, i.e., the surface closest to the viewer, is accurately recorded. This means that data packets are fetched back and forth from main memory to cache and vice versa each time. Once all the pixels have been written to the colour buffer and the Z buffer, the image has been generated.

To display the generated image, the colour buffer is copied to a frame buffer 23 from which the visible image on the VDU 24 (see FIG. 1) is generated. Often, a double buffering arrangement is used to speed up the process; two frame buffers are provided, one is used to refresh the display to make the current frame visible, the other is available for construction of the next image. Once the image has been supplied to a frame buffer, the Z buffer 34 and colour buffer 32 are both reset by the renderer 36 to their background values, and rendering is begun for the next frame.

It is now proposed that, by a change of the order of the processing steps, a more efficient buffer clearing process can be achieved. A first improvement in moving away from the known technique would be to avoid clearing the whole colour buffer. This could be achieved by the steps of:

1. rendering the pixels covered by the foreground polygons in the colour buffer.
2. clearing the remaining pixels in the colour buffer to the background colour.
3. clearing the Z buffer in preparation for the next frame.

The information as to which polygons are foreground and which are background is in the Z buffer—if a location in the Z buffer holds a background value (which will be taken as zero in the following examples although other values may be specified), the corresponding pixel is foreground. Therefore by combining steps 1 and 3, the inventive technique is achieved.

The first step is to render only the foreground polygons in the colour buffer. Next, the Z buffer is scanned and the value of each pixel is checked. If the value is zero, the pixel is not foreground and the colour buffer is cleared to the background colour; there is no need to clear the Z buffer because it is set to zero. If the value in the Z buffer is not zero, the pixel is foreground and the colour buffer already contains the appropriate colour; the Z value in the Z buffer can be cleared to zero. At the end of the Z buffer scan, all Z values are zero, i.e. the Z buffer has been cleared and only the colour values corresponding to non-foreground pixels have been cleared to background.

The prior art and inventive processes when embodied in, for example, a RISC processor with onboard cache memory can be summarised as shown in the table below. Typical RISC cache operation for handling memory accesses begins with alteration of a first byte in memory for which no cache block has been allocated. When a block is allocated, the existing contents are returned to memory (if appropriate) and the full contents of the new data from memory are written to the cache block before any of it can be processed in the cache. Other caching techniques will be well known to the skilled reader.

| Prior Art Process | Inventive Process |
| --- | --- |
| Read ALL blocks of colour buffer into cache. | Read SOME blocks of colour buffer into cache. |
| Write ALL cache blocks back to colour buffer. | Write SOME blocks of colour buffer into cache. |
| "X" memory transfers to render foreground scene in colour buffer | "X" memory transfers to render foreground scene into colour buffer. |
| Read ALL blocks of Z buffer into cache. | Read ALL blocks of Z buffer into cache. |
| Write ALL blocks of Z buffer from cache back to main memory. | Write SOME blocks of Z buffer into cache. |

Although the frame-updating process according to the invention will generally require more processing, in order to work out which pixels need to be cleared, the time taken for the additional processing is insignificant in terms of clock cycles in comparison with the time required to transfer data from main memory to cache in accordance with the prior art arrangement. The inventive process can be applied with a double-buffer arrangement or a single output frame buffer.

Figure 3A:
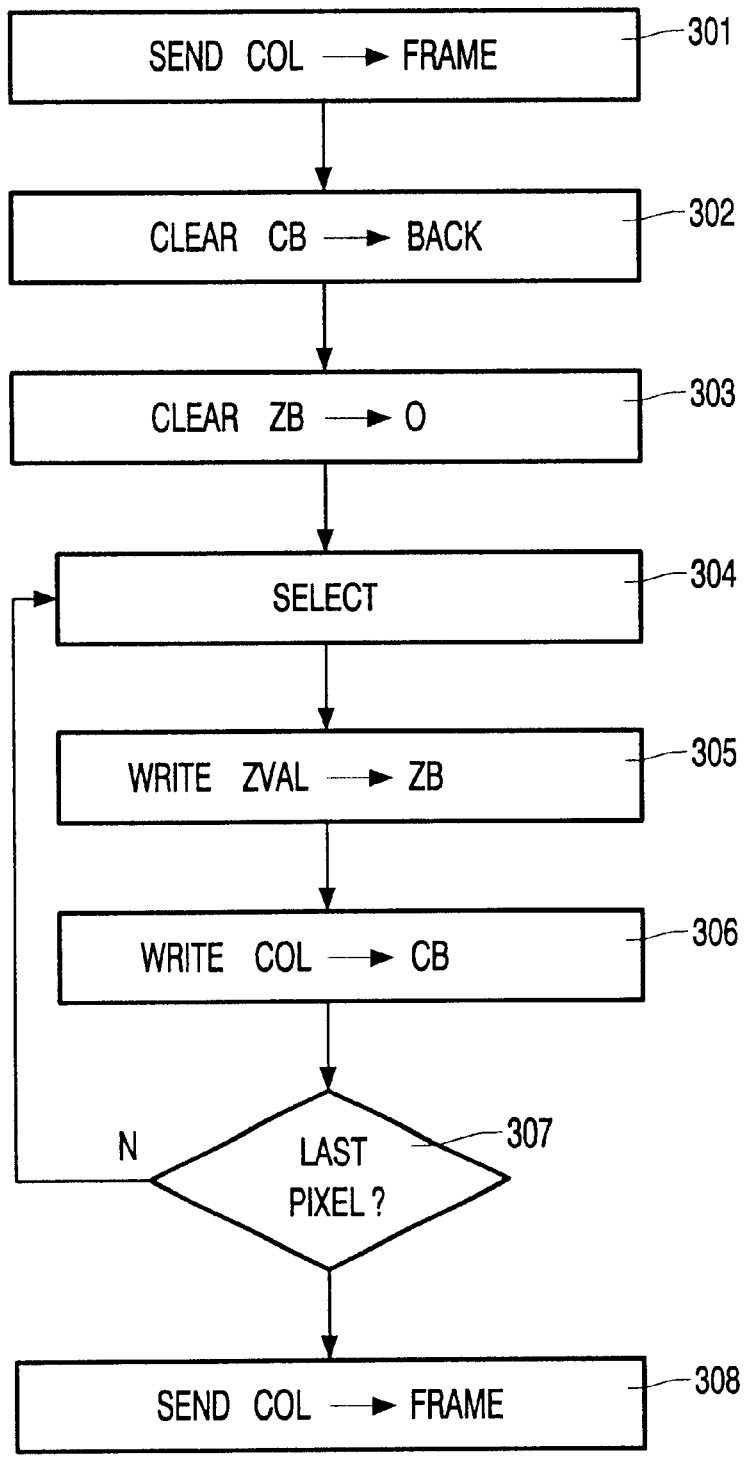
FIG. 3 illustrates flow charts of the operation of a buffering clearing process in the prior art and the inventive arrangements.
Figure 3B:
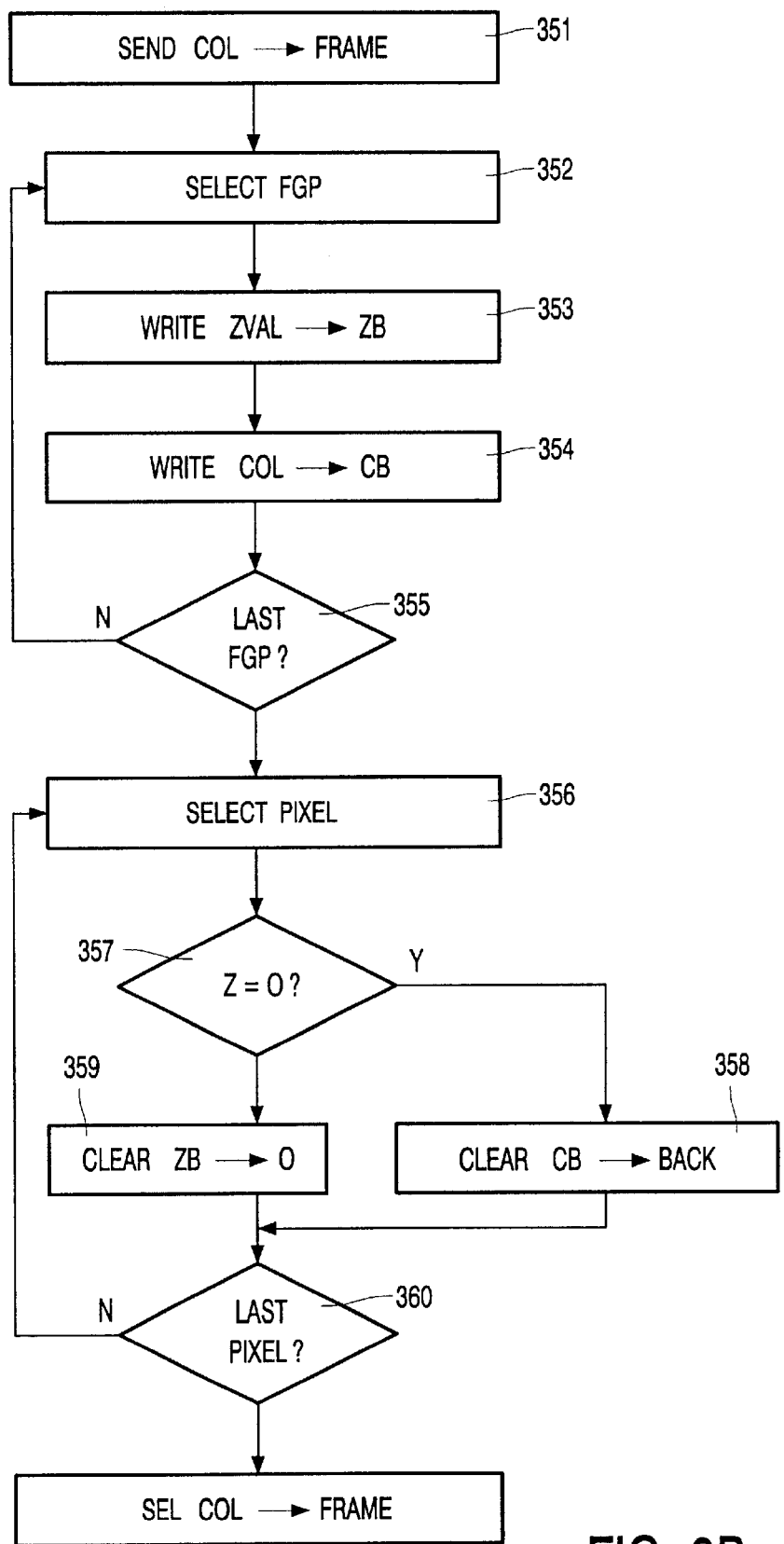

The detailed steps in the prior art process are illustrated in FIG. 3A, and commence with the sending of colour values to the frame buffer (step 301) followed by clearing the colour buffer to background (step 302) and clearing the Z buffer to zero (step 303). The process then enters a loop where, for each pixel, the pixel is selected (step 304) the Z value is written to the Z buffer (step 305) and the colour value is written to the colour buffer (step 306). On determining at step 307 that all pixels have been handled, the process exits the loop and the colour values are then sent to the frame buffer at step 308. The detailed steps in the inventive process are illustrated in FIG. 3B and again commence with the sending of colour values to the frame buffer (step 351) following which the process enters a loop where, for each foreground pixel, the pixel is selected (step 352), the Z value is written to the Z buffer (step 353) and the colour value is written to the colour buffer (step 354). On determining at step 355 that all foreground pixels have been handled, the process exits this first loop and commences a second in which a scan of the Z buffer is undertaken, commencing with selecction of a pixel (step 356). For each pixel, a determination is made as to whether the depth value is set to zero (step 357) and, if so, the colour buffer is cleared to background (step 358): if not the Z buffer is cleared to zero (step 359). On determination at step 360 that no further pixels remain to be handled in this second loop, the process moves to the sending of colour values to the frame buffer at step 361.

It is a further advantage of the rendering and clearing process according to the invention that the Z values need not be scanned one by one, but can be read from memory to the cache in groups of N pixels, each pixel in a group then being processed. Such an arrangement provides a further increase in processing speed as will be readily understood by those familiar with the known tile-based rendering techniques.

The size N of a group is selected so that a) it is small enough for at least one group to fit into a block of the cache memory of the processor 10;

b) it is small enough to maximise the probability of all consecutive pixels in a group being of the same type, i.e., all foreground or all background; and c) it is large enough to minimise the total number of block transfers between main memory and cache.

The present applicants have found that a suitable value for N is 16. If all sixteen consecutive pixels, within a group are filled with background colour, the Z buffer need not be cleared and does not have to be written back to main memory, so time is saved. If all sixteen consecutive pixels within a group are filled with foreground colour, the colour buffer does not need to be cleared and therefore is not read from nor written back to main memory, thus saving time.

Reference has been made above to the use of two frame buffers, one being used to refresh an image while the next frame is rendered in the other. An alternative arrangement uses a separate output buffer to hold an image for display, but making the image copy in the output buffer requires further bandwidth and may be considered to be wasteful.

Figure 4:
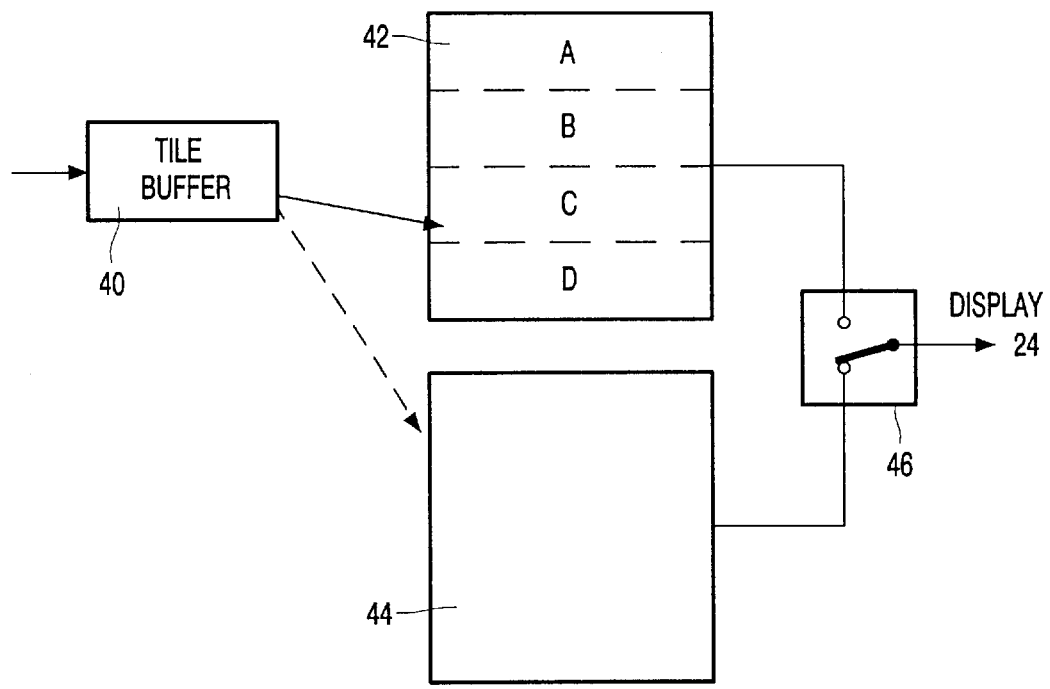
FIG. 4 illustrates a tile buffer and a pair of output buffers.

However, by use of a tiled rendering buffer, it is possible to economise on memory yet further, if the inventive method is used. A preferred embodiment of the invention using a tile buffer is illustrated in FIG. 4. A tile buffer 40 is shown connected to a first output buffer 42, and can also be connected to a second, identical output buffer 44. The buffers 42, 44 are connected through a switch 46 to a display system.

The tile buffer 40 is arranged to build up a section of the image which is one quarter of the screen height and a full screen width, corresponding to the sections A, B, C, D in the output buffer 42. One section of the image is built up in the tile buffer, which contains colour and Z values; when the tile buffer 40 is full, the section is transferred to the appropriate part of the output buffer 42, only the colour values being transferred, and the next section of the image is constructed in the tile buffer. When the first output buffer 42 is full, it is connected through switch 46 to the display and the tile buffer 40 is connected to the first section of the second output buffer 44.

It is of course necessary for the tile buffer to provide a complete image to one of the output buffers before the image can be displayed so, for an images rendered as M separate tiles, M rendering and transfer operations need to take place. The combined memory per pixel used in rendering is large (eg. 4 bytes for colour and 4 bytes for Z value), but there can be a saving in the memory cost of the operation, even with the need to provide two output buffers. The technique also allows the use of a colour compression scheme in the output buffer (loaded from the tile buffer) to provide yet further savings in memory.

An additional advantage of this embodiment is that background colour insertion can be carried out when a pixel is transferred from the tile buffer 40 to one of the output buffers 42, 44. For each pixel, the Z value is read; if it is zero, the background colour is copied to the output buffer; if it is not zero, the colour is copied to the output buffer and the Z value is cleared to zero. This further reduces the traffic required to clear memory.

The result is that for pixels in parts of the image which are background, colour values are never either read or written, and the Z buffer is read but not written. For pixels which are foreground, the Z values are read and written and the colour values are copied, but the rendering colour buffer 32 is not written.

Summarising, for application of the inventive process to the copying scenario the simplified steps are:

| Without invention: | With invention: |
| --- | --- |
| WRITE all Z buffer. | READ all Z buffer. |
| READ all colour buffer. | WRITE some Z buffer. |
| WRITE all colour buffer. | READ some colour buffer. |

A further reduction in memory bandwidth has therefore been achieved.

Even when the background is not a constant colour, e.g. the VRML background node sky-ground model, the background colour computation can be incorporated in the routine to copy pixels from the tile buffer 40 to one of the output buffers 42, 44; this avoids computation of background colour when the background is not visible.

This invention includes variations which will be apparent to persons skilled in the art. Such modifications may involve features which are already known in the design, manufacture and use of image processing apparatus and devices and component parts thereof and which may be used instead of or in addition to features already described herein.

What is claimed is:

1. A method of operating a Z buffer and a color buffer in an image processing system for providing a two-dimensional image composed of a plurality of polygonal image primitives and a background, said method comprising the steps of:

a) rendering image primitives relating to foreground in the color buffer and the Z buffer;

b) scanning the Z buffer and for each pixel, if the Z value does not represent a foreground pixel, clearing the corresponding location in the colour buffer to a background colour, and if the Z value represents a foreground pixel, clearing the Z buffer to a predetermined background value.

2. A method according to claim 1 in which the Z values are provided to the Z buffer in groups of N pixels.

3. A method according to claim 2 in which the value of N is selected to maximise the probability of all consecutive pixels in a group comprising either background or foreground pixels.

4. A method as claimed in claim 1 wherein said predetermined background value is zero.

5. A method of operating a Z buffer and a color buffer in an image processing system for providing a two-dimensional image composed of a plurality of polygonal image primitives and a background, said method comprising the steps of:

a) rendering image primitives relating to foreground in the color buffer and the Z buffer;

b) scanning the Z buffer and for each pixel, if the Z value does not represent a foreground pixel, copying the background color to a store, and if the Z value represents a foreground pixel, copying the color value to the store and clearing the Z value to a predetermined background value.

6. A method according to claim 5 in which the Z values are provided to the Z buffer in groups of N pixels.

7. A method according to claim 6 in which the value of N is selected to maximise the probability of all consecutive pixels in a group comprising either background or foreground pixels.

8. A method according to claim 5 comprising performing the rendering and scanning steps relating to a part of an image in sequence, and transferring information relating to each said part to the store until a full image is stored.

9. A method according to claim 8 in which the transferring step includes a colour compression step.

10. A method as claimed in claim 5 wherein said predetermined background value is zero.

11. An image processing system for providing a two-dimensional image composed of a plurality of polygonal image primitives and a background, comprising means to provide a three-dimensional image; memory and processing means to provide said two-dimensional image related to the three-dimensional image including a Z buffer and a color buffer arranged so that image primitives relating to foreground are first rendered in the color buffer and the Z buffer, and subsequently the Z buffer is scanned and for each pixel, if the Z value does not represent a foreground pixel, the corresponding location in the color buffer is cleared to a background color, and if the Z value represents a foreground pixel, the Z buffer is cleared to said predetermined background value.

12. An image processing system according to claim 11 further comprising tile buffer means and first and second output buffer means.

13. An image processing system for providing a two-dimensional image composed of a plurality of polygonal image primitives and a background, comprising means to provide a three-dimensional image; memory and processing means to provide said two-dimensional image related to the three-dimensional image including a Z buffer and a color buffer arranged so that image primitives relating to foreground are first rendered in the color buffer and the Z buffer, and subsequently the Z buffer is scanned and for each pixel, if the Z value does not represent a foreground pixel, a background color is copied to a further store, and if the Z value represents a foreground pixel, the color value is copied to the store and the Z value is cleared.

14. An image processing system according to claim 13 further comprising tile buffer means and first and second output buffer means.

* * * * *